3,056,224
TESSELLATED SURFACE COVERING
Richard Almy and David T. Zentmyer, Lancaster Township, Lancaster County, Pa., assignors to Armstrong Cork Company, Lancaster, Pa., a corporation of Pennsylvania
Filed Dec. 9, 1958, Ser. No. 779,107
10 Claims. (Cl. 41—23)

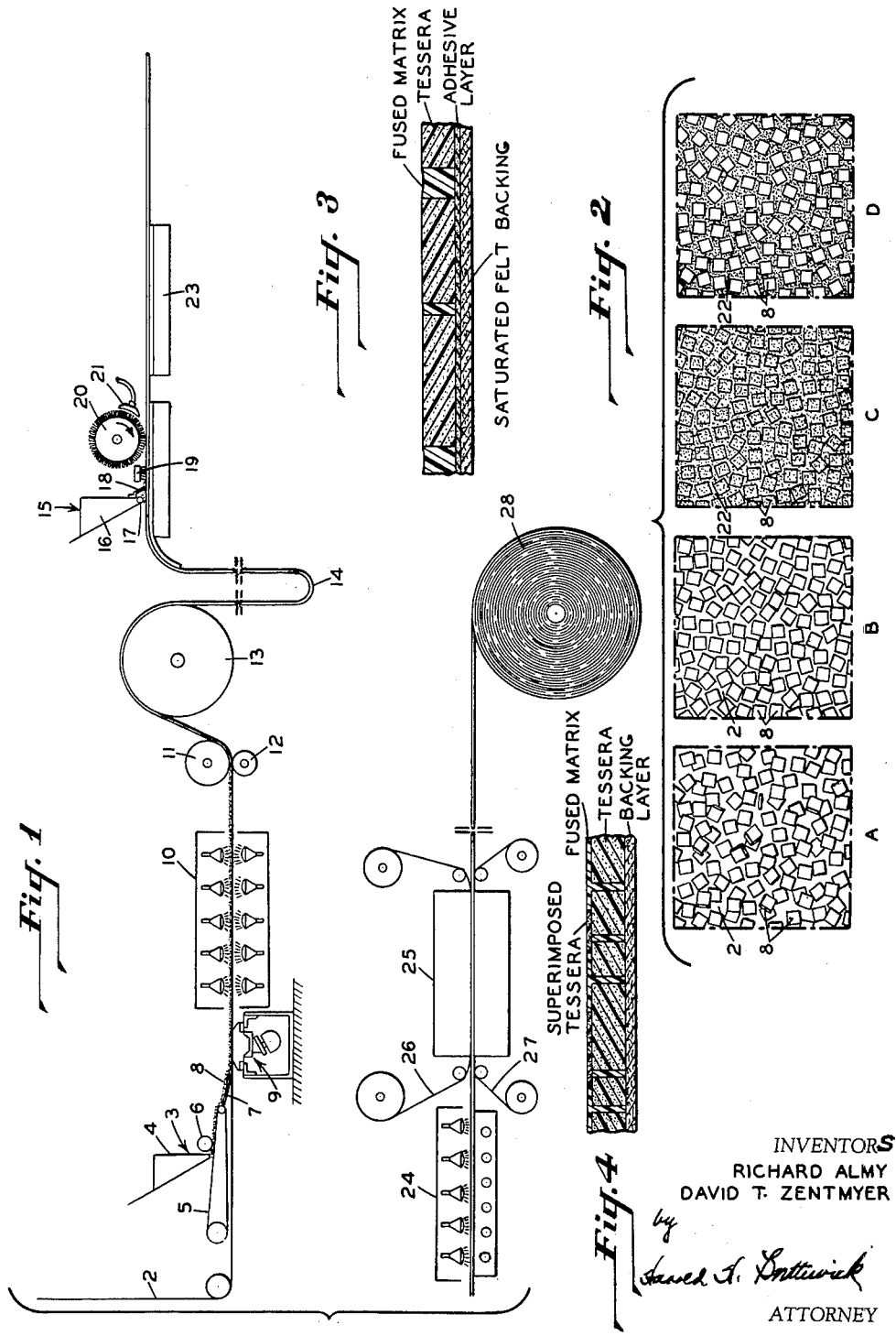

This invention relates to a tessellated surface covering.

Mosaic floor and wall decorations have been made for years by imbedding small pieces of stone, glass, metal, fired ceramic materials, or the like, in wet mortar and grouting the joints between the adjacent pieces, usually with hydraulic setting cements. This process may be used to produce highly artistic, decorative effects, but requires excessive hand work in the laying of the individual pieces and, therefore, is quite expensive. Also, the resulting product is hard, cold, and difficult to maintain, particularly when used as a floor. The type of design effect created with mosaics has appeal for modern decorators, designers, and homemakers, however, and the principal object of the present invention is to provide a mosaic or tessellated surface covering which will be resilient, relatively warm, easy to maintain, and which will have the decorative possibilities of hand-laid mosaic work. Another object of the invention is to provide a method of fabricating a tessellated surface covering which will eliminate the need for any substantial hand inlaying of the tesserae, but which will result, nevertheless, in a finished product possessing the aesthetic appeal of a hand-crafted mosaic material.

The preferred covering of the invention comprises a supporting or backing layer, such as an impregnated felt sheet, carrying resilient tesserae, such as tesserae severed from sheets of differently colored, filled and pigmented vinyl chloride polymer resin compositions, a vinyl chloride-vinyl acetate resin composition, for example, secured to the backing in spaced relationship, and a matrix, such as an unfilled vinyl chloride homopolymer resin composition, filling the spaces between the tesserae and bonding them into an integral wearing layer.

Generally stated, the preferred method comprises positioning the resilient tesserae on the supporting or backing layer in spaced position, filling the spaces between the tesserae with a dry powdered heat sensitive matrix material, such as the unfilled vinyl chloride homopolymer composition referred to above, and applying heat and pressure to the tesserae and matrix material on the supporting or backing layer to bond the tesserae together into an integral wearing layer.

In order that the invention may be readily understood, certain embodiments of the method and the article will be described in conjunction with the attached drawing, in which:

FIGURE 1 is a diagrammatic view, in two sections joined as indicated by the bracket, showing one method of making the surface covering;

FIGURE 2 is a diagrammatic view, also joined by a bracket, illustrating the evolution of the surface covering as the process proceeds through the various steps shown in FIGURE 1; and FIGURES 3 and 4 are sectional views to an enlarged scale showing pieces of finished tessellated surface coverings embodying the invention.

Referring to FIGURES 1 and 2, the backing layer 2 is fed from a suitable source not shown, such as a roll. For purposes of illustration, the backing may be a beater saturated asbestos fiber felt such as disclosed in Feigley Patent 2,759,813, issued August 21, 1956. This backing may be about 75" wide, about .039" thick and of indefinite length. The upper face of the backing layer in this embodiment carries a dried, heat activatable adhesive, such as as acrylic resin adhesive of the following formulation:

Example I

Parts by weight
Plasticized acrylic resin (46% solids) _____ 19
Clay filler _____ 17

A volumetric feeding unit 3 which includes a hopper 4, a delivery conveyor 5, a metering roll 6, and a delivery chute 7 is arranged to deliver a mass of tesserae 8 onto the backing 2. The general disposition of the tesserae is as shown in the left hand portion of FIGURE 2 which has been designated by the letter "A." Some of the tesserae may be disposed in overlapping relationship, some may be positioned on edge, and as a general rule, the tesserae will be irregularly spaced apart with objectionably large, intervening areas. The tesserae preferably are formed by shearing them from colored sheets of calendered thermoplastic vinyl resin compositions. In the illustration, the tesserae are of generally square outline and may be about $3/16''$ x $3/16''$ x .070" thick, with the two major faces calender-formed and thus relatively smooth.

The following formula will provide a composition suitable for use in the formation of the tesserae, all parts being given by weight:

Example II

Vinyl chloride-vinyl acetate copolymer resin with
  2–3% vinyl acetate, specific viscosity 0.20
  (Vinylite VYNW, calculated average molecular
  weight about 22500) _____ 29.16
Dioctyl phthalate _____ 9.27
Epoxidized soya bean oil (Paraplex G–62) _____ 1.30
Barium-cadmium soap plus an organic inhibitor
  as a stabilizer for the resin (Ferro 1825) ____ 0.91
Ground limestone filler _____ 57.80
Pigment _____ 1.56
                                          ———
                                          100.00

In the preparation of the compound, the materials may be combined on a mill such as a two-roll rubber mill and sheeted off as a calendered ribbon about 10" wide and .070" thick and of indefinite length. This ribbon may be cooled and then severed into tesserae about $3/16''$ x $3/16''$ x .070" thick, as mentioned previously. In the milling and sheeting operation, relatively smooth surfaces are provided on the faces of the sheet. The severing operation may be performed by a rotary dicing machine. This provides tesserae with relatively sharply cut edges.

The backing 2 with the tesserae disposed thereon is fed over a vibrator or a plurality of vibrators, as indicated diagrammatically at 9, FIGURE 1. The vibration which is effected causes the superimposed tesserae to slide relative to one another over their faces and causes the tesserae to move laterally into contact with one another at points of contact. Also, any tesserae which may be disposed on edge are caused to fall to a flat position. Generally, it is preferred to effect vibration in two spaced zones extending throughout the full width of the web, with the web downwardly inclined slightly, for example about 15–20 degrees, in its travel between the two vibrating zones. The amplitude of vibration is critically related to the thickness of the chips in that the amplitude must be limited so that the chips are not caused to override one another but must be ample to effect the desired orientation of the tesserae. The desired action is first to separate the tesserae to provide open spaces into which any superimposed tesserae may fall and after the tesserae have been disposed flatwise in a single layer, then to close the open spaces by moving the tesserae into edgewise contact.

The disposition of the tesserae 8 on the backing 2 upon completion of the vibrating step is indicated in the second section of FIGURE 2, designated by the letter "B." It will be observed that a great many of the tesserae engage only at points of contact and only a few engage along the length of an abutting edge. In practically all instances, a major portion of the periphery of each tessera is separated by at least a narrow line from its neighboring tessera and there are no major open spaces between them. In other words, substantially all of the tesserae are spaced from adjacent tesserae along at least a substantial portion of the peripheries thereof although they may and generally do engage one another at points where their peripheries abut. For most mosaic effects, this disposition of the tesserae is desirable.

In the next step of the process, the tesserae are keyed to the backing layer 2. With tesserae of vinyl chloride polymer resin composition as in Example II and acrylic resin adhesive layer as in Example I, this keying may be accomplished by heating the tesserae and the adhesive by the use of infra-red heaters. These have been indicated in FIGURE 1 by the numeral 10. If desired, the underside of the backing layer 2 may be heated also in a similar fashion, as indicated in FIGURE 1. While the temperatures employed will vary with the type of tesserae used, the nature of the backing layer, and the composition of the keying adhesive, if one be used, a mean temperature of the tesserae 8 and backing 2 at exit from the heater 10 in the order of 270° F. to 360° F., with an optimum temperature of about 350° F., will be satisfactory in the manufacture of a surface covering using a backing of asbestos felt, beater saturated to the extent of about 16% of the weight of the felt with a butadiene-styrene latex, an acrylic resin adhesive of the formula of Example I, with tesserae .070" thick formulated as in Example II.

The heated material is then engaged by a pair of rolls 11 and 12 which apply sufficient pressure to the tesserae and the backing layer to key the tesserae to the backing, the bond being adequate to permit the material to pass over a pull roll 13, pass through a dip 14, and receive the powdered matrix material without dislocation of the tesserae on the backing. Roll 11 may be water cooled, and its face temperature may be maintained at about 130° F. to 190° F. and may operate in conjunction with roll 12 as a solid back-up roll which is not tmperature controlled, a pressure of about 10 pounds to 100 pounds per lineal inch being applied by the rolls to the material passing therebetween. The dip is required where the tesserae are applied and oriented on a continuously moving backing web and consolidation is effected intermittently in a flat bed press. The dip also provides for the necessary cooling of the material before the deposit of the matrix material. The material should be reduced in temperature as much as conveniently possible in the dip. A temperature as close as possible to room temperature, about 70° F., is preferred but temperatures as high as 170° F. have been found to be operable.

The dry powdered matrix material is delivered onto the surface of the backing and over the tesserae. The matrix composition may be of the same base material as that of the tesserae. For example, with the composition of Example I used in the formation of the tesserae, the following composition will provide a compatible matrix material. In this example, all parts are given by weight.

*Example III*

| | |
|---|---|
| Polyvinyl chloride homopolymer, specific viscosity 0.12 (Vinylite QYSA) | 74.58 |
| Dioctyl phthalate | 19.13 |
| Epoxidized soya bean oil (Paraplex G–62) | 3.95 |
| Stabilizer (Ferro 1825) | 2.33 |
| Pigment | .01 |

In the preparation of this matrix material, the powdered resin is compounded with the plasticizers and stabilizer and mild heat is applied which causes the plasticizer and stabilizer to be diffused throughout the resin particles. It will be noted that there is a small quantity of coloring pigment used in the matrix composition and this serves to tint it without rendering it opaque; it is transparent when fused. It is obvious, of course, that a fully transparent or a fully opaque matrix material may be used and that metallic, and other powders may be incorporated into the matrix for special decorative effects. The size of the particles in the matrix powder may be varied depending upon the size of the spaces between the tesserae to be filled. Generally a fine powder is used. A sieve size of 20 mesh or finer is preferred.

It is preferred to use a polyvinyl chloride homopolymer resin as the base for the matrix material and to incorporate the plasticizer and stablizer by mixing without fusion. However, fusion may be effected and the fused product reduced to a powder. The use of a polyvinyl chloride homopolymer is preferred because it permits the use of a low molecular weight resin to give desired flow during pressing, without having any tendency to soften during the dry blending of the homopolymer with the plasticizer, stabilizer, and other ingredients.

A volumetric feeder, generally indicated at 15, may be used to feed the matrix material onto the backing carrying the tesserae keyed thereto. It includes a hopper 16 which receives the powdered material, a metering roll 17 which delivers a measured quantity of the powder to the surface, and a doctor blade 18 which levels the layer of applied powder. An oscillating distribution brush 19 may be provided to work the powder down into the small crevices which may exist between adjacent tesserae. It is important to completely fill the spaces between the tesserae. A rotary cleaning brush 20 which is rotated in the direction of the arrow shown in FIGURE 1 may be used to sweep any excess powder from the surface of the tesserae. It is preferred to leave as little of the matrix material on the face of the tesserae as possible, particularly where it is pigmented or otherwise colored. A suction cleaner 21 may be provided to prevent redeposit of excessive powder from brush 20 onto the surface of the tesserae. Where the matrix material as finally fused is transparent, as contrasted with an opaque matrix material, the presence of powder on the face of the tesserae is not objectionable and in fact a layer of substantial thickness may be provided. The brush 20 may be so adjusted as to sweep out some of the matrix material between the tesserae for special depressed or embossed effects, if desired. Self-embossing may be accomplished by the use of a matrix material which has different stress relaxation characteristics than those of the tesserae. This is disclosed more fully in the copending application of David T. Zentmyer, Serial No. 788,272, filed January 22, 1959, now U.S. Patent No. 3,000,754.

The material in the condition in which it leaves the matrix powder applying and distributing unit, prior to cleaning with the brush 20, is shown in the portion of FIGURE 2 which has been designated by the letter "C." Here the matrix powder has been indicated by the numeral 22. The material as it leaves the station after passing below the cleaning brush 20 is shown in the section of FIGURE 2 marked with the letter "D." It will be noted that the powdered matrix material has been swept clean of the tesserae.

The material leaves the cleaning station and passes over an inspection table 23 where imperfections may be noted and corrected. If any area is incompletely filled with matrix powder, it may be brushed in by hand in the station or if any area be devoid of tesserae, they may be filled in and matrix powder applied to the repaired area.

The material next is preheated and then is consolidated under heat and pressure. In the embodiment shown in FIGURE 1, the preheating may be effected by means of radiant heaters 24 which heat the powder and the tesserae to the desired temperature for consolidation in a flat bed press as indicated at 25. With the backing, tesserae, and matrix materials described in the specific examples above, the mean temperature at the face of the sheet as it leaves the heater 24 may be about 275° F. to 360° F., with a temperature of about 300° F. the optimum. The upper platen of the press 25 may be heated to a temperature of about 275° F. to 360° F., about 350° F. being optimum. The lower press platen is not heated. The temperature at the face of the material is elevated to about 270° F. to 350° F., with a temperature of about 340° F. an optimum temperature. A pressure of about 200 pounds to 1,500 pounds per square inch is applied in the press 25. About 1,400 pounds per square inch gives excellent results. The press is opened upon attainment of the desired temperature at the face of the material; no dwell period is required.

In the preparation of a finished floor covering about .090″ thick from a backing .039″ thick and tesserae as mentioned above about .070″ thick, the tesserae will average about .058″ thick after final consolidation and formation of a finished product about .090″ thick. The compositions of the tessera and matrix preferably are selected so as to have a large difference in plasticity at the processing temperatures, with the matrix composition being more plastic, i.e. having higher plasticity, than the tesserae composition. This can be accomplished by: (1) adding filler, (2) changing plasticizer level, (3) using resins with different molecular weights, (4) using resins with different amounts of comonomers, and (5) various combinations of two or more of the above.

In the above examples, many of the variables have been changed but not all have been in the direction of differential plasticity. Filler has been used in the tesserae composition to reduce plasticity of the tesserae and a lower molecular weight resin has been used in the matrix composition to increase its plasticity. Other variations which appear in the compositions of Examples II and III were made for other reasons and in spite of their adverse effects on differential plasticity. The net result, however, is a substantial differential in plasticity between the two compositions. Actual values for the plasticity of the tesserae and matrix compositions of the above Examples II and III at 340° F., the preferred operating temperature mentioned above, are as follows:

| | Plasticity at 340° F. |
|---|---|
| Tesserae composition (VYNW resin) Example II | 8.9 |
| Matrix composition (QYSA resin) Example III | 16.8 |

Plasticity is determined in the following manner: A Wabash press, an electrically heated, hydraulically actuated press may be used. The temperature of the press platens is set at the desired temperature ±1.0° F., 340° F. being used in the plasticity test referred to above. Quilon treated press release paper, as disclosed in United States Patent 2,772,141 is used between the specimen under test and the press platens.

Weigh a 1.0 gram sample of the composition to be tested and place it in the center of the face of a 6″ x 6″ piece of Quilon paper. Place a second piece of Quilon paper face down over the sample. Press in the center of the Wabash press by raising the pressure as rapidly as possible to 20,000 pounds and holding the pressure there for 10 seconds. Release the pressure quickly, remove the sample, and allow it to cool to room temperature before stripping the top release paper.

Using a rule, measure to the nearest 1/100 inch the face diameters of the pressed material along two directions at right angles to one another. Two samples of each material (tesserae composition and matrix composition) should be run at the selected temperature. Average the four values (the two diameters of each of the two samples) and square the average to obtain $D^2$, the measure of plasticity.

To prevent sticking of the material to the platens of the press 25, webs of release paper 26 and 27 may be interposed between the platen surfaces and the material being pressed as is well known in the manufacture of vinyl resin type surface coverings (see Dunlap Patent 2,772,141 mentioned above).

With the composition of Example III disposed between chips of the composition of Example II, with the matrix material lying level with the upper surface of the chips, consolidation of the mass will result in a slight depression of the matrix material, for it has a greater stress relaxation factor than that of the composition of the tesserae; and thus, when heat fusion and consolidation have been effected, there is formed a gradually sloping upper surface on the matrix material between adjacent tesserae as shown in FIGURE 3. This provides a very desirable light and shadow effect in the surface covering but does not make the covering difficult to maintain, for the depressions are slight and are smooth and curve up to the edges of the tesserae. The whole unit is integrally joined and is free of any cracks or crevices which would tend to hold dirt or dust.

The material after final consolidation generally is fed into a festoon for cooling and then is rolled as indicated at 28. The product may be finally inspected, trimmed and packaged for shipment as roll goods, or if desired, the material may be cut into tiles or other units. The finished product is shown in FIGURE 3 where appropriate legends have been applied to the various parts.

The present invention is not limited in any particular composition for the resilient terrerae. Thermoplastic resinous compositions are preferred. Vinyl resins of the class consisting of the polymers and copolymers of vinyl chloride, copolymers of vinylidene chloride, and mixtures thereof, such as polyvinyl chloride, vinyl chloride-vinyl acetate, vinyl chloride-vinylidene chloride, vinylidene chloride-vinyl acetate, and vinyl chloride-vinyl acetate-vinyl alcohol, which is a trimer, as well as other vinyl resins of this class and their equivalents may be used alone or in various combinations. Chlorinated polyethylene is an example of another thermoplastic vinyl resin which is useful.

Generally the composition from which the tesserae are formed will include the thermoplastic resin, a plasticizer for the resin to provide the desired resiliency in the tesserae, and filler and pigment material.

Novel effects may be achieved by combining various types of tesserae in the pattern. For example, striking designs can be created by the use of differently colored filled tesserae formed as in Example II above, combined with transparent but tinted tesserae alone or in combination with metallic tesserae formed by the use of metallic pigment particles or flakes in the composition from which the tesserae are formed. Pearlesent or opalesent tesserae or tesserae having a marble or granite graining may also be used alone or in combination with other kinds of tesserae.

The matrix material preferably is a powdered thermoplastic resinous composition as mentioned above. The vinyl resins which are useful in the tesserae composition may be used in the matrix composition. The matrix composition usually will include a plasticizer for the resin to provide a resilient matrix for the tesserae. The matrix material should, of course, be capable of joining the tesserae into an integral wearing layer. Where a plasticized thermoplastic vinyl resin composition, as Example III, is used as the matrix powder with a plasticized thermoplastic vinyl resin composition, as Example II, constituting the binder for the tesserae, there results, upon consolidation of the matrix powder and tesserae and fusion of the matrix composition under the applied heat and pressure, an amalgamation of the tesserae and matrix at the peripheries of the tesserae, producing a joint-free wearing layer.

While the invention has been illustrated using square shaped tesserae, they may be of other configurations, such as triangles, rectangles, circular discs, annuluses, or a combination of these or other regular or nonregular geometrical shapes.

The use of an adhesive to key the tesserae to the backing layer is optional. With many supporting and backing layers no adhesive is required. Obviously, the adhesive composition may be varied, the thermoplastic acrylic resin of Example I, being illustrative only.

A unique multidepth effect may be achieved by first forming a layer of tesserae on a supporting or backing web and filling the spaces between the tesserae with a powdered matrix composition which is unfilled, then placing on top of the layer so formed spaced thin tesserae and if necessary additional powdered matrix composition which is unfilled. The material is then subjected to heat and pressure which fuses the powder into a transparent matrix so that the upper faces of the tesserae in the lower layer are visible through the matrix in the areas not covered by the thin tesserae in the upper layer and the peripheral edges of the tesserae in the lower layer are also visible. This product is shown diagrammatically in section in FIGURE 4 where appropriate legends have been applied.

The color, size, and shape of the tesserae may be varied over wide limits and the present invention is not concerned with any particular pattern effect. The effects obtainable by the practice of the present invention are virtually unlimited.

Where a transparent matrix material is used, it may be desirable to pigment the backing layer or any adhesive coating which may be applied to the backing layer so that when the backing material is viewed through the transparent matrix, the desired color effect is obtained. (The term translucent is used throughout in the specification and claims in its broad sense to include translucent or semi-transparent as well as fully transparent matrix materials.) Also, the backing may be printed, by a rotogravure process for example, to provide a desired background effect. Where a transparent matrix is used with opaque tesserae, the provision of a pigmented or decorated surface on the backing layer enhances the depth effect which is achieved.

While a synthetic rubber saturated asbestos felt has been referred to as a suitable backing material, other backing materials may be employed, such as burlap; cotton sheeting; or asphalt, resin, or oleoresinous saturated felt; in fact, any of the backing materials which are used in the surface covering industry may be used. For some services, it may be desirable to provide an unbacked surface covering and this can be accomplished by stripping the facing material from the backing layer. One method of accomplishing this result is disclosed in the copending application of Lloyd V. Hassel, Serial No. 620,652, filed November 6, 1956, now U.S. Patent No. 2,913,773.

The product is ideally suited for use as a floor covering but may be used on walls, counter and table tops and elsewhere as a surface covering.

We claim:

1. In a tessellated surface covering, a resilient thermoplastic decorative layer comprising a plurality of resilient opaque tesserae of plasticized thermoplastic vinyl resin composition disposed substantially in a single plane and disposed to provide a non-geometric pattern, said tesserae extending to the surfaces of said decorative layer and at least a major portion of said tesserae being spaced from adjacent tesserae along at least a substantial portion of the periphieries thereof, said tesserae being disposed so that substantially all spaces between adjacent tesserae are smaller than the individual tessera, and a resilient matrix of a substantially transparent thermoplastic vinyl resin composition filling substantially the entire area between said spaced tesserae above the bottom surface of said tesserae and bonding said tessera into an integral decorative layer, said tesserae and said matrix forming the surfaces of said decorative layer.

2. A tessellated surface covering in accordance with claim 1 in which there is a transparent surface layer of clear vinyl resin over said decorative layer.

3. A tessellated surface covering in accordance with claim 1 in which the tesserae are flat and substantially square.

4. A tessellated surface covering in accordance with claim 1 in which the opaque tesserae are comprised of a plurality of different colors.

5. A tessellated surface covering in accordance with claim 1 in which the thermoplastic resin compositions forming the resilient tesserae and the matrix material are chosen from the class consisting of polymers and copolymers of vinyl chloride, copolymers of vinylidene chloride, and mixtures thereof.

6. A tessellated surface covering in accordance with claim 1 in which said matrix lies in the general plane of the tesserae at the peripheries thereof and is depressed slightly below the general plane in the areas between adjacent peripheries, thus achieving an embossed appearance.

7. A tessellated surface covering comprising an opaque backing layer and a decorative wearing layer bonded to said backing layer and comprising opaque design elements with a transparent matrix surrounding the design elements, said decorative wearing layer comprising a plurality of resilient opaque tesserae of plasticized thermoplastic vinyl resin composition of essentially uniform thickness overlying the upper surface of said backing layer and bonded individually thereto as a facing of single, opaque design elements disposed in a non-geometric pattern with at least a major portion of said elements being spaced from adjacent elements along at least a substantial portion of the peripheries thereof and with said elements terminating in a common plane parallel to and above the general plane of the upper surface of the backing layer, said tesserae being disposed so that substantially all spaces between adjacent tesserae are smaller than the individual tessera, and a substantially transparent resilient matrix of thermoplastic vinyl resin composition bonded to said backing layer and filling substantially the entire area between said spaced design elements above the surface of the backing layer and bonding said design elements into an integral decorative wearing layer affixed to the supporting backing layer.

8. A tessellated surface covering in accordance with claim 7 in which the thermoplastic resin compositions forming the resilient tesserae and the matrix material are chosen from the class consisting of polymers and copolymers of vinyl chloride, copolymers of vinylidene chloride, and mixtures thereof.

9. A tessellated surface covering in accordance with claim 7 in which the matrix material is in the general plane of the tesserae at the peripheries thereof and is slightly depressed below said general plane in the areas between adjacent peripheries, thus achieving an embossed appearance.

10. A tessellated surface covering in accordance with claim 7 in which the tesserae are substantially flat and square.

References Cited in the file of this patent

UNITED STATES PATENTS

| | | |
|---|---|---|
| 504,506 | Verhaghen | Sept. 5, 1893 |
| 1,394,149 | Cumfer | Oct. 18, 1921 |
| 1,728,398 | Dearden | Sept. 17, 1929 |
| 1,754,253 | Avery | Apr. 15, 1930 |
| 1,813,901 | Bayne | July 14, 1931 |
| 1,857,856 | Medina | May 10, 1932 |
| 1,872,998 | McCarthy | Aug. 23, 1932 |

(Other references on following page)

UNITED STATES PATENTS

| | | | |
|---|---|---|---|
| 1,897,458 | Whitney | Feb. 14, 1933 |
| 1,931,650 | Elmendorf | Oct. 24, 1933 |
| 2,374,940 | Kemmler | May 1, 1945 |
| 2,455,777 | Jones | Dec. 7, 1948 |
| 2,453,441 | La Fair | Nov. 9, 1948 |
| 2,867,263 | Bartlett | Jan. 6, 1959 |
| 2,888,975 | Benedict | June 2, 1959 |
| 2,949,689 | Vida | Aug. 23, 1960 |
| 2,987,102 | Heinrichs | June 6, 1961 |